(12) United States Patent
Jayasimha et al.

(10) Patent No.: US 11,528,077 B2
(45) Date of Patent: Dec. 13, 2022

(54) SELECTION, DIVERSITY COMBINING OR SATELLITE MIMO TO MITIGATE SCINTILLATION AND/OR NEAR-TERRESTRIAL MULTIPATH TO USER DEVICES

(71) Applicant: AST & Science, LLC, Miami, FL (US)

(72) Inventors: Sriram Jayasimha, Midland, TX (US); Jyothendar Paladugula, Hyderabad (IN)

(73) Assignee: AST & Science, LLC, Miami, FL (US)

( * ) Notice: Subject to any disclaimer, the term of this patent is extended or adjusted under 35 U.S.C. 154(b) by 13 days.

(21) Appl. No.: 16/905,446

(22) Filed: Jun. 18, 2020

(65) Prior Publication Data

US 2020/0412440 A1    Dec. 31, 2020

Related U.S. Application Data

(60) Provisional application No. 62/951,618, filed on Dec. 20, 2019.

(30) Foreign Application Priority Data

Jun. 25, 2019  (IN) .............................. 201911025299
Jun. 29, 2019  (IN) .............................. 201911026070

(51) Int. Cl.
  *H04B 7/01*    (2006.01)
  *H04B 7/185*   (2006.01)

(52) U.S. Cl.
  CPC ............. *H04B 7/1855* (2013.01); *H04B 7/01* (2013.01); *H04B 7/18515* (2013.01); *H04B 7/18517* (2013.01)

(58) Field of Classification Search
  CPC ...... H04B 7/01; H04B 7/0802; H04B 7/0837; H04B 7/18513; H04B 7/18515; H04B 7/1855

(Continued)

(56) References Cited

U.S. PATENT DOCUMENTS 5,995,807 A * 11/1999 Magnier .................. H04B 1/74
                                                    455/226.3
6,442,385 B1 * 8/2002 Marko ............... H04B 7/18534
                                                    244/158.4

(Continued)

OTHER PUBLICATIONS

Arapogolu, MIMO over Satellite, 2011, IEEE vol. 13, No. 1.*

*Primary Examiner* — Robert J Lopata
(74) *Attorney, Agent, or Firm* — Blank Rome LLP

(57) ABSTRACT

A ground station processes downlink signals received from respective satellites. The ground station has a plurality of signal conditioning devices each receiving a respective one of the downlink signals and providing a conditioned downlink signal. A plurality of Doppler and/or Delay compensator devices each receive a respective conditioned downlink signal from a respective one of the plurality of signal conditioning devices. The compensator devices conduct Doppler and/or Delay compensation on the received conditioned downlink signal, and provide a compensated downlink signal output. A selector or diversity combiner receives the compensated downlink signal from each of the plurality of Doppler and/or Delay compensators. The selector or diversity combiner selects one of the received compensated downlink signals based on received signal strength of each received compensated downlink signal to provide a selected downlink signal, or diversity combines all of the received compensated downlink signals to provide a diversity combined signal. The selector or diversity combiner provides the selected downlink signal or the diversity combined signal to an eNodeB.

8 Claims, 5 Drawing Sheets

Satellites visible to a geographic cell in polar region

Concept of Satellite Diversity combining (SDC)

(58) Field of Classification Search
USPC .......................................................... 370/316
See application file for complete search history.

(56) References Cited

U.S. PATENT DOCUMENTS

| | | | |
|---|---|---|---|
| 6,775,251 B1* | 8/2004 | Wiedeman | H04B 7/18558 370/316 |
| 7,639,646 B2* | 12/2009 | Schiff | H04B 7/18534 370/331 |
| 2004/0095907 A1* | 5/2004 | Agee | H04B 7/0417 370/334 |
| 2011/0028087 A1* | 2/2011 | Avellan | H04B 7/18513 455/12.1 |
| 2011/0028088 A1* | 2/2011 | Avellan | H04B 7/18528 455/13.2 |
| 2011/0142025 A1* | 6/2011 | Agee | H04W 72/042 370/342 |
| 2012/0018585 A1* | 1/2012 | Liu | B64G 1/1085 244/158.6 |
| 2014/0273815 A1* | 9/2014 | Jayasimha | H04B 7/195 455/13.2 |
| 2017/0086255 A1* | 3/2017 | Jayasimha | H04B 7/0837 |
| 2017/0238216 A1* | 8/2017 | Damnjanovic | H04B 7/18541 455/427 |
| 2019/0123811 A1* | 4/2019 | Potter | H04B 7/18534 |
| 2019/0165856 A1* | 5/2019 | Roy | H04B 7/18517 |
| 2021/0044349 A1* | 2/2021 | Yao | H04B 7/01 |
| 2021/0218464 A1* | 7/2021 | Yao | H04B 7/195 |

\* cited by examiner

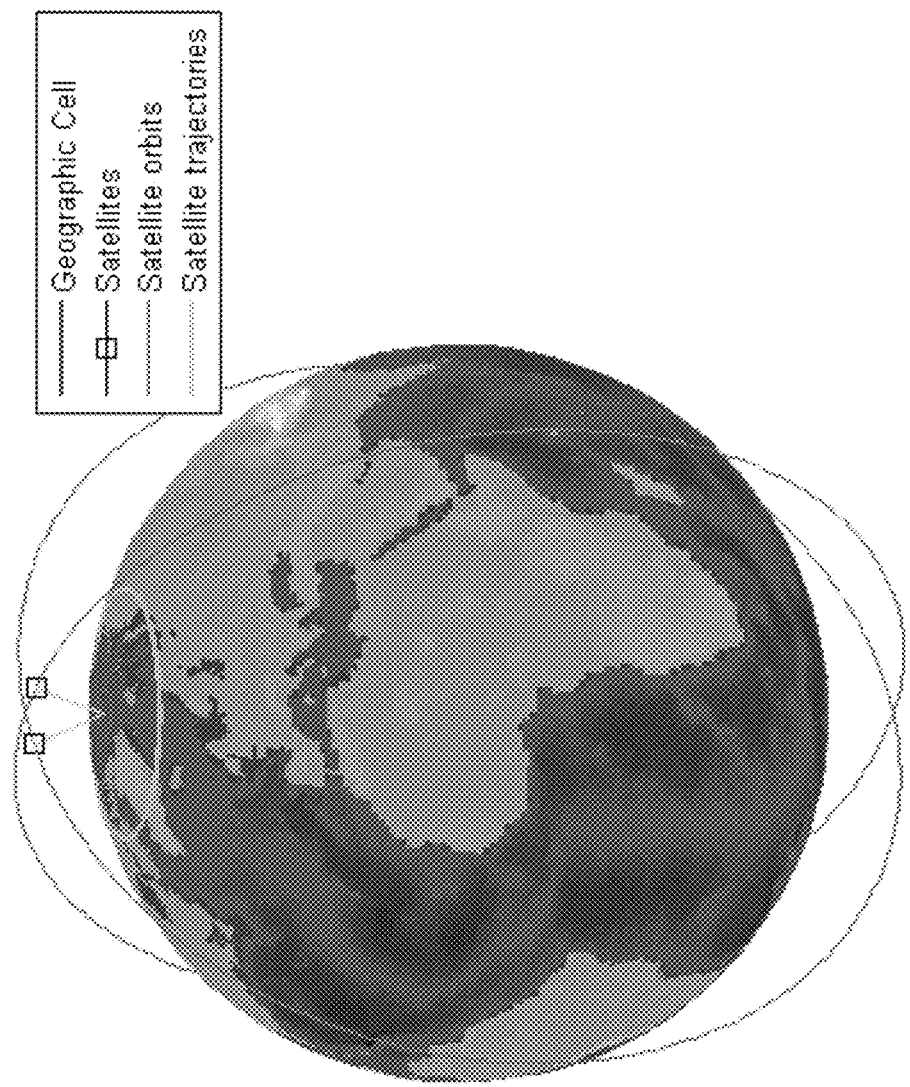
Fig 1a. Satellites visible to a geographic cell in polar region

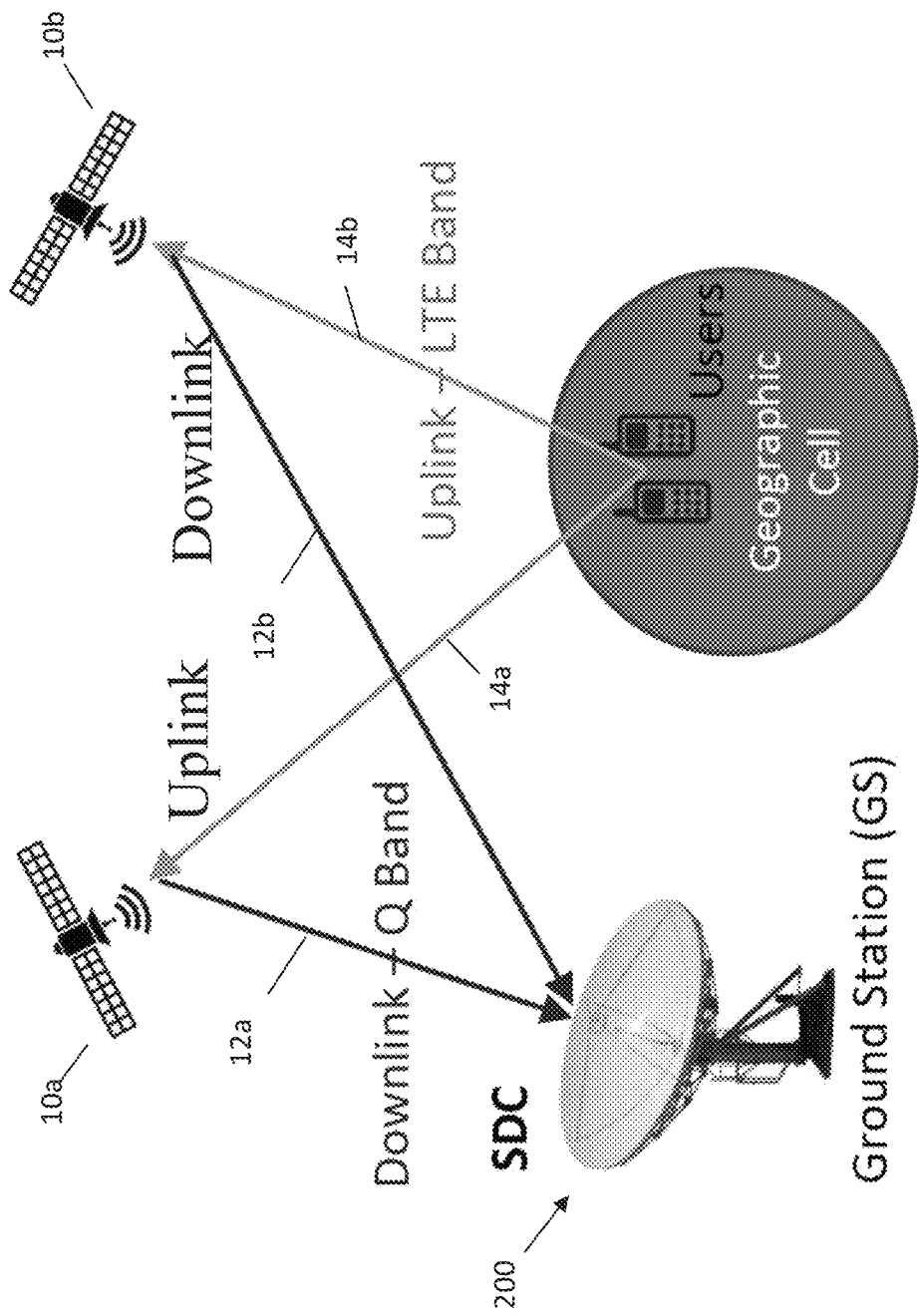
Fig 1b. Concept of Satellite Diversity combining (SDC)

SELECTION, DIVERSITY COMBINING OR SATELLITE MIMO TO MITIGATE SCINTILLATION AND/OR NEAR-TERRESTRIAL MULTIPATH TO USER DEVICES

RELATED APPLICATIONS

This application claims the benefit of priority of India Application Nos. 201911025299, filed Jun. 25, 2019, India Application No. 201911026070, filed Jun. 29, 2019, and U.S. Provisional Application No. 62/951,618, filed on Dec. 20, 2019, the content of which is relied upon and incorporated herein by reference in its entirety.

BACKGROUND

The present disclosure relates to standard mobile user equipment (UEs) to be connected to base-station equipment (e.g., eNodeB's or gNodeB's in 4G and 5G mobile communications parlance) located at gateways, with at least two directional antennas, tracking Low-Earth Orbit (LEO) relay satellites. The communications between the UEs and the LEO satellites are typically in UHF/L-band (i.e., 600-900 MHz or 1800-2100 MHz bands), while the satellite-to-gateway links are in Q/V band. Impairments of interest in the UHF/L-band to LEO satellite links are ionospheric scintillation and terrestrial multipath losses. The primary impairments in the Q/V band link from/to the gateway to/from the satellite are rain-induced attenuation and/or depolarization. While diversity combining is a well-understood concept in many communication systems (including satellite communication systems), we focus here on the type of diversity combining needed in the above-stated scenario.

SUMMARY

A ground station processes downlink signals received from respective satellites. The ground station has a plurality of signal conditioning devices each receiving a respective one of the downlink signals and providing a conditioned downlink signal. A plurality of Doppler and/or Delay compensator devices each receive a respective conditioned downlink signal from a respective one of the plurality of signal conditioning devices. The compensator devices Doppler and/or Delay compensate the received conditioned downlink signal to a nominal zero frequency offset and a constant delay right through the satellite pass. A selector or diversity combiner receives the compensated downlink signal from each of the plurality of Doppler and/or Delay compensators. The selector or diversity combiner selects one of the received compensated downlink signals based on received signal strength of each received compensated downlink signal to provide a selected downlink signal, or diversity combines all of the received compensated downlink signals to provide a diversity combined signal. The selector or diversity combiner provides the selected downlink signal or the diversity combined signal to an eNodeB.

BRIEF DESCRIPTION OF THE FIGURES

FIG. 1(a) shows satellites visible to a geographic cell in polar region.

FIG. 1(b) shows the concept of Satellite Diversity Combining (SDC).

DETAILED DESCRIPTION

Figure 2A:
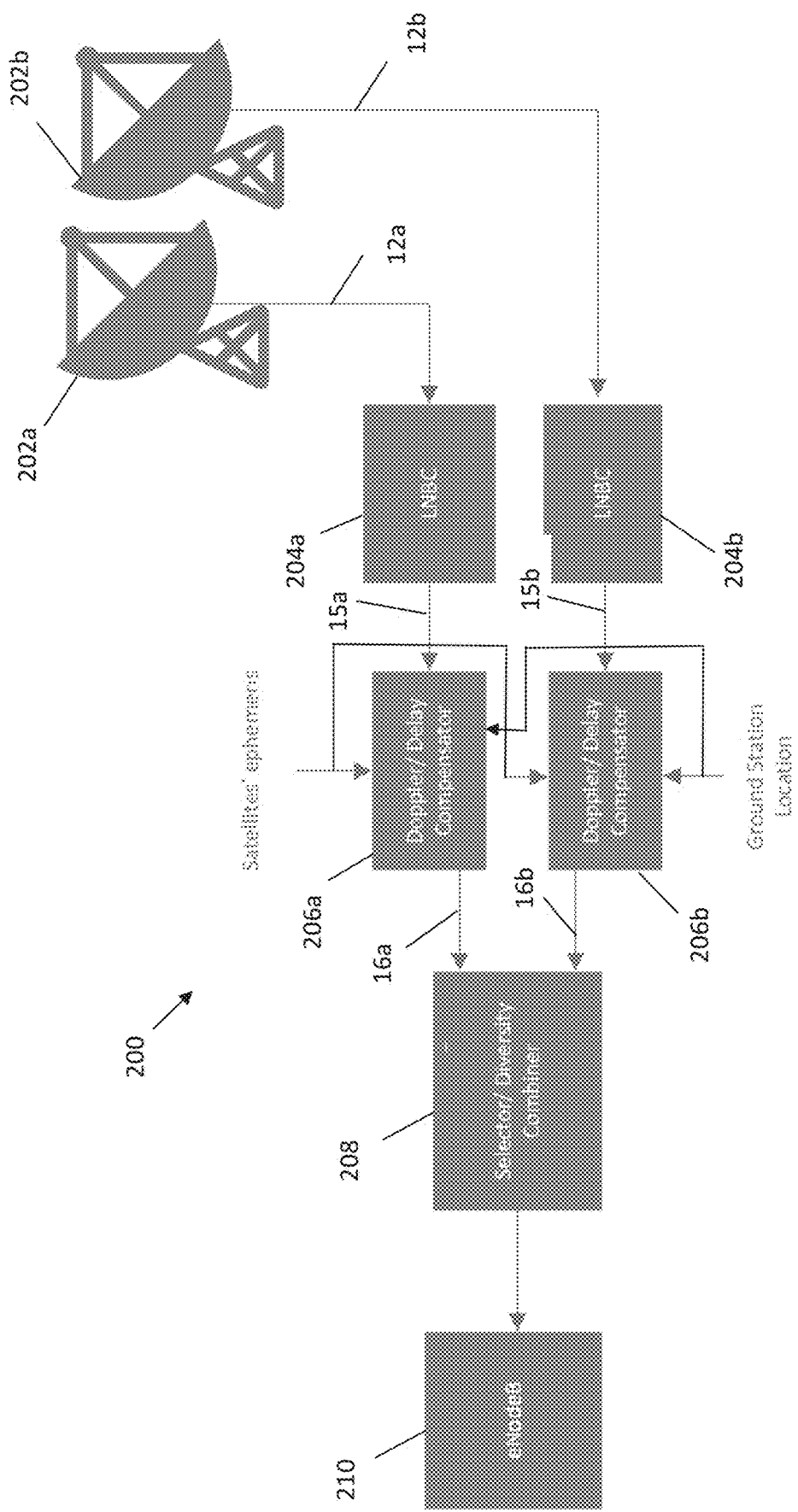
FIG. 2(a) is a block diagram of scintillation mitigation through RSSI-based satellite switching or diversity combining.

In describing the illustrative, non-limiting embodiments of the disclosure illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments of the disclosure are described for illustrative purposes, it being understood that the disclosure may be embodied in other forms not specifically shown in the drawings.

Ionospheric scintillations are rapid temporal fluctuations in both amplitude and phase of trans-ionospheric UHF and L-band signals caused by the scattering due to irregularities in the distribution of electrons encountered along the radio propagation path. The most severe scintillations are observed near the poles (at auroral latitudes) and near the equator (within ±20° of geomagnetic equator). For example, with a polar constellation, satellite selection in polar regions can overcome scintillation loss there, since the terminal devices or stations, e.g., User Equipment (UE) can see two (or more) satellites 10a, 10b served by the same Ground Station (GS) 200, as shown in FIGS. 1(a), 1(b). In addition, depending on satellite elevation seen by the User Equipment (UE), both uplink and downlink encounter near-terrestrial multipath spread.

As further illustrated in FIGS. 1(a), 1(b), UEs such as mobile cellphones are in a ground cell served by a single base station 200, e.g., eNodeB. Those UEs send an uplink signal 14a, 14b (which are power-limited to −7 dBW) in the LTE (Long-Term Evolution) band susceptible to scintillation to a respective one of the two (or more) overhead satellites 10a, 10b in a low-earth orbit (LEO) constellation. The satellites 10a, 10b relay those signals to each of the ground station 200 (which can be in the UE cell or elsewhere) on a respective high frequency downlink 12a, 12b, such as the Q- and/or V-bands. As ionospheric scintillation, when it occurs, diminishes with the square of the carrier frequency, the relay downlinks 12a, 12b are high enough frequency so that ionospheric scintillation is negligible. In addition, the antenna beam-widths to the satellites 10a, 10b from the GS 200 are narrow enough to avoid near-terrestrial multipath.

Turning to FIG. 2a, a ground station 200 are is shown, having respective first and second antennas 202a, 202b, first and second Low Noise Block Down Converters (LNBCs) 204a, 204b, first and second Doppler/Delay Compensators 206a, 206b, a Selector/Diversity Combiner 208, and a processing device, e.g., eNodeB 210, for a given cell. The antennas 202 each receive/transmit an inbound/outbound signal from/to a respective satellite 10, 20 and the ground station. The received downlink signals 12a, 12b are received by a respective one of the antenna 202a, 202b, then provided to a respective signal conditioning device 204a, 204b. Thus, the first antenna 202a receives the first downlink signal 12a and provides that first downlink signal 12a to the first signal conditioning device 204a; and the second antenna 202b receives the second downlink signal 12b and provides that second downlink signal 12b to the second signal conditioning device 204b.

A separate signal conditioner 202a, 202b is provided for each downlink signal 12a, 12b from a respective satellite 10, 20. The signal conditioning device 204a, 204b translates signal frequency from Q-band to the LTE-band, filters out-of-band spurious, and amplifies it prior to further processing, to provide a conditioned downlink signal 15a, 15b.

In addition, a separate Doppler/Delay Compensator 206a, 206b is provided for each downlink path. Each of the conditioned downlink signals 15a, 15b from the respective satellites 10a, 10b are received by a respective Doppler/Delay Compensator 206a, 206b. The Doppler/Delay compensator 206a, 206b eliminates Doppler and nominalizes delay if a UE is located at the center of the cell. At other UE locations, Doppler and Delay are nearly compensated (to within 0.1 ms and to within 600 Hz at cell edge at the highest UE to eNodeB frequency considered, i.e., 900 MHz). The Doppler/Delay Compensator 206a, 206b then outputs a respective compensated downlink signal 16a, 16b.

The satellite ephemeris input to each compensator 206a, 206b is the trace of the respective satellite which is a typical two-line element (TLE) data readily available (e.g., on the internet). The ephemeris data indicates the position and orbital parameters of the satellite. This can be used, for example, to compute the radial velocity component (and hence Doppler) from the ground station.

The ground station location information input to both of the compensators 206a, 206b can be, for example, from the GPS location of the ground station 200. The ground cell location information input to both the compensators can also be from a local database that lists the cells to which the eNodeBs at GS are providing the service. There is usually a small residual frequency and phase mismatch in the compensators 206 due to either the TLE and/or the ionospheric delay and/or the terrestrial multipath environment (e.g., when the direct path from the UE to the satellite is blocked). This mismatch determines the type of diversity combining used. Both the satellite ephemeris and the ground station data are used as the radial velocity component (hence Doppler) so that both delay and Doppler can be compensated by the compensators 206.

In the downlink path, the compensated downlink signal 16a, 16b that is output from each of the compensators 206a, 206b is received at the Selector/Combiner 208. The Selector/Combiner 208 performs signal selection based on a Receive-Strength Signal Indicator (RSSI) (e.g., the RSSI determines the strength of each signal 16a, 16b, and the selector 208 selects the compensated downlink signal 12a, 12b with the greater strength) or can perform Diversity Combining. Since diversity combining signals requires residual frequency and phase mismatch from the compensators 206 to be near-zero, RSSI-based signal selection is utilized, rather than diversity combining. Thus, in most cases, the Selector/Diversity Combiner 108 will select one of the compensated signals from one of the compensators 206 and output a selected downlink signal (either the first compensated downlink signal 12a or the second compensated downlink signal 12b) for transmission to the eNodeB 210 that serves that cell.

Alternatively, in cases where the two compensated downlink signals 16a, 16b have a near-exact compensation (e.g., such that a stronger signal is not readily apparent), the two compensated downlink signals 16a, 16b are instead diversity combined (e.g., coherently combining the two signals). For example, when both signals levels are within a threshold (e.g., 3 dB, though other suitable thresholds less than 3 dB can be used) of each other, the selector 208 does not select one of the signals 16a, 16b, but instead the signals 16a, 16b are diversity combined and presented to the eNodeB 210. In this manner, we improve availability and reliability of high average-revenue-per-user (ARPU) subscribers in chosen locations. For example, diversity combining can be utilized when the two signals can be made coherent (i.e., with the same frequency and phase, thus adding signals after the phase shift between a common component in them is made close to 0) (e.g., when the signals have near-equal levels). Accordingly, the Selector/Combiner 208 either selects one of the two compensated downlink signals 16a, 16b (if one is stronger than the other by more than the threshold), or diversity combines the two downlink signals 16a, 16b, which can be done in accordance with any suitable technique for example by coherently combining the two compensated downlink signals 16a, 16b.

Thus, at the Ground Station 200, both Doppler and delay in the two satellite paths (from a single cell) are compensated by the compensator 206a, 206b as to nearly seamlessly switchover (the stronger signal is switched in using receive signal strength indicators, or RSSIs) from one satellite path to the other (or to diversity combine one satellite path with the other). The switchover can occur in real time. And while two paths are shown in the figures, more paths can be provided and the combiner 208 can combine or select from amongst all of the paths.

The effect of the RSSI-based switching mechanism is seen as more frequent LEO satellite hand-offs—break-before-makes—from a fixed ground location. This is because scintillation loss mitigation is based on measured signal strength (RSSI), rather than only satellite ephemeris, where Doppler and delay compensation must continuously operate on at least two satellite paths (in convention systems, Doppler and delay compensation at the ground station, GS, occurred for only the ephemeris-based selected satellite).

Because resource block durations are short in extant mobile communications protocols, diversity combining may not be necessary. However, with two (or more) antenna eNodeBs 210a, 210b, diversity combining inherent to single-input multiple-output (SIMO) may be exploited (after Doppler and delay compensation as shown in the first processing device 210a option of FIG. 2b).

When ionospheric scintillation occurs, one or the other satellite path on the downlink signal 12a, 12b is less affected by it. In this case, the RSSI-based selection at the selector 208 provides the less affected signal (i.e., the stronger signal 16a, 16b). In other cases, when ionospheric scintillation is minimal, the signals 16a, 16b are within a threshold of each other, and coherent combining provides a better SNR signal to the eNodeB 210.

The signal conditioning devices 204 receives the forward link signal from the eNodeB 210, translates signal frequency from LTE-band to Q-/V-band, amplifies it and transmits it to the respective satellite 10, 20 using the appropriate gateway antenna 202.

Although the forward link (eNodeB 210 to the UEs, see FIG. 3), is also in a similar frequency band as the return link (UEs to the eNodeB, see FIGS. 2a and 2b), and has similar losses (for satellite selection), the forward link satellite selection is only ephemeris-based (rather than RSSI-based) primarily because beam generation is from either the first satellite 10a or the second satellite 10b to the cell (unlike the reverse link where both satellites 10a, 10b are active—for the given cell—and RSSI-based switching to the eNodeB occurs at the GS 200). It is noted that if both satellites 10a, 10b are active on the forward link, the two signals could interfere at the UE (and the eNodeB 210 prevents that by selecting one or the other satellite path 206a/204a or 206b/204b). Choosing the satellite which has a path with the highest average ground elevation is one selection method, though there may be other criteria.

Figure 2B:
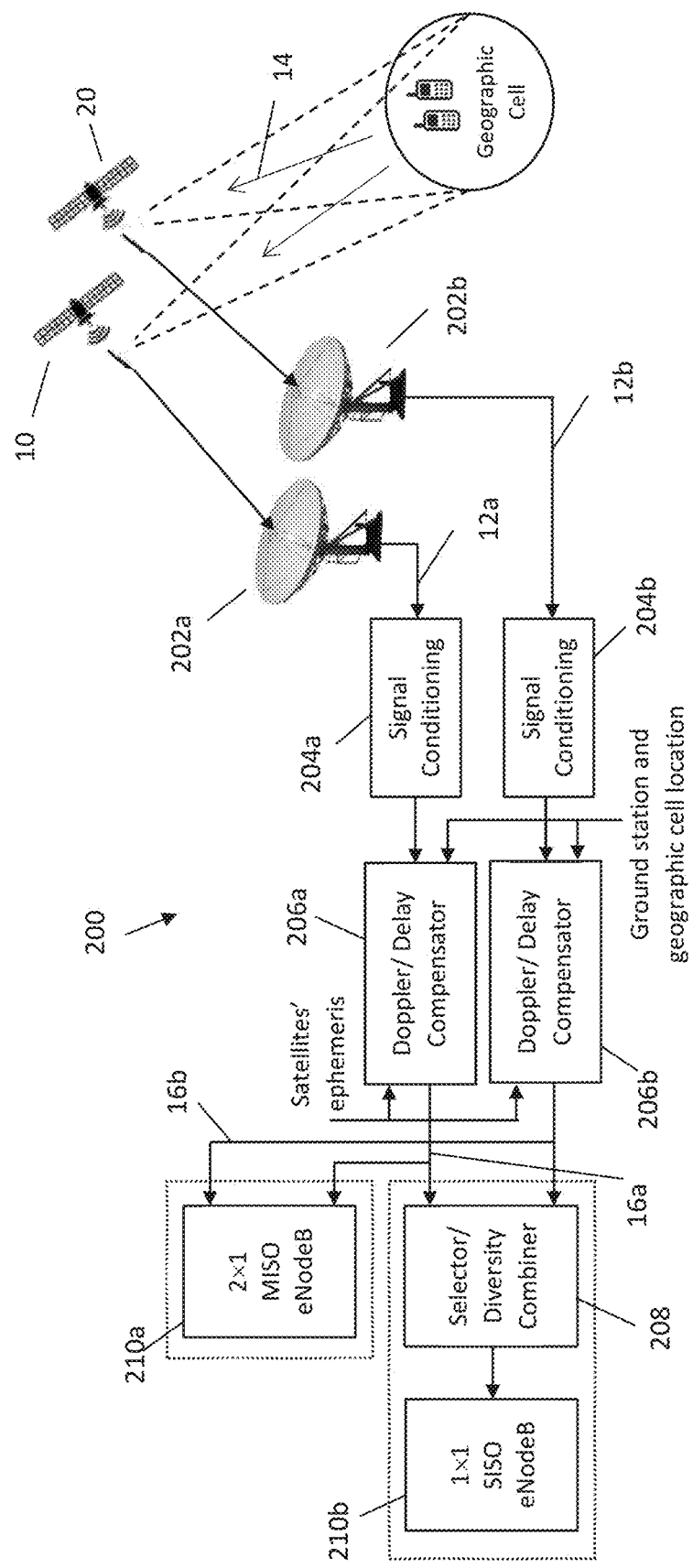
FIG. 2(b) shows scintillation/multipath mitigation through RSSI-based satellite switching or diversity combining or SIMO.

Referring to FIG. 2(b), the ground station system 200 can be configured to have a first processing device (e.g., the first eNodeB 210a) and a second processing device (e.g., the second eNodeB 210b). The UEs could be configured for 2×1 MISO (multiple-input, single-output) 210a, so that both satellites paths can carry the same down-link signal. The first eNodeB 210a receives the compensated downlink signals 16a, 16b from the compensators 206a, 206b in the 2×1 MISO. At the same time, a second eNodeB 210b can be a 1×1 SISO (single-input single-output). The selector/combiner 208 receives the compensated downlink signals 16a, 16b from the compensators 206a, 206b and sends its output (either the first compensated downlink signal 16a or the second compensated downlink signal 16b; or the diversity combined first and second compensated downlink signals 16a, 16b) to the second eNodeB 210b. When UEs operate in 1×2 SIMO mode, the downlink signals 12a, 12b received from both satellites 10a, 10b are different. Hence, we cannot use the diversity combiner 208. The diversity combiner 208 is only applicable in SISO mode, when identical signal comes through different satellite channels. FIG. 2(b) when operating in SISO mode is same as FIG. 2(a), and the compensated downlink signals 16a, 16b are processed to the second eNodeB 210b via the selector/diversity combiner 208. When operating in MISO mode, FIG. 2b further shows the additional option of having a 2×1 MISO eNodeB 210a when compared to FIG. 2a, and the downlink signals 16a, 16b are processed by the first eNodeB 210a.

Figure 3:
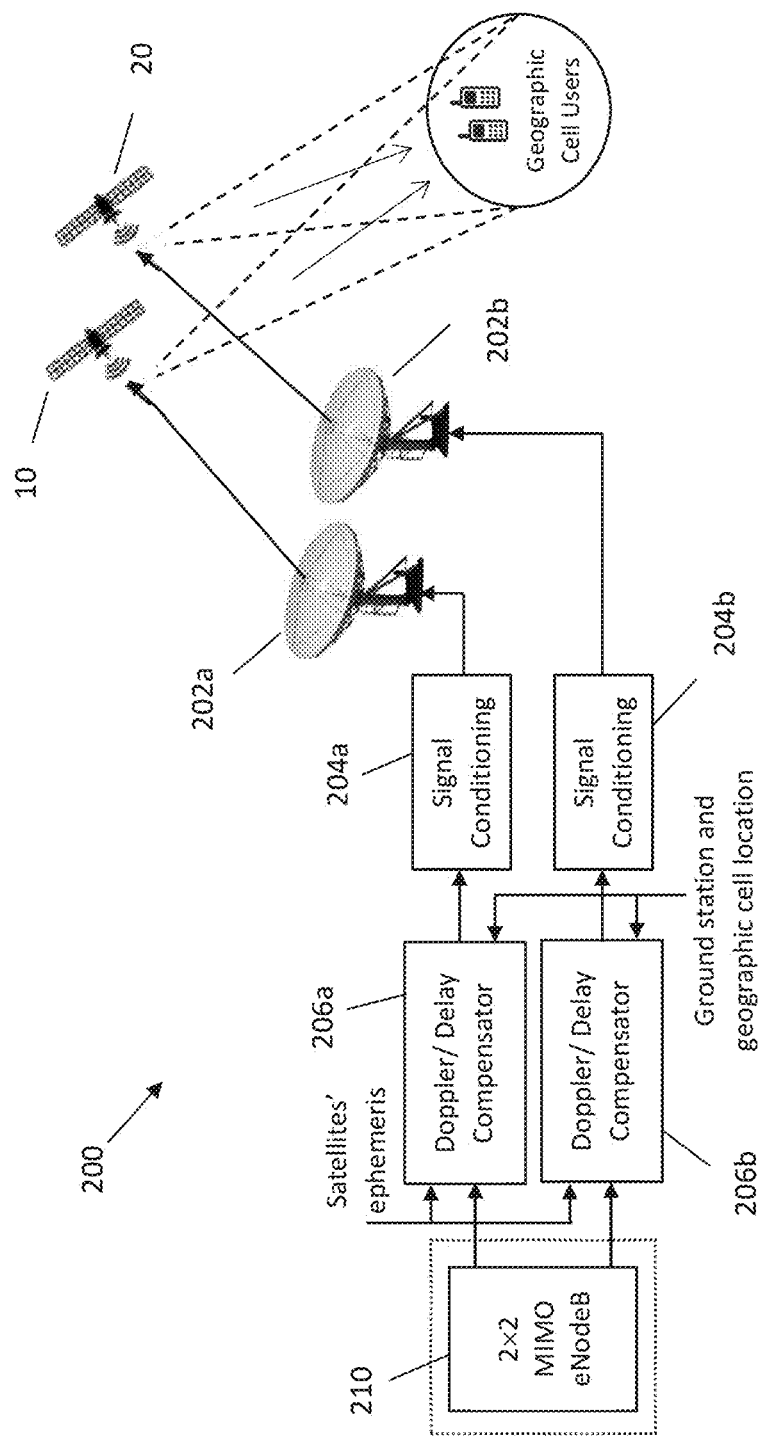
FIG. 3 is a 2×2 bi-directional MIMO exploiting two-antenna UEs.

Turning to FIG. 3, another embodiment of the disclosure is shown for the forward link signal, where the ground station 200 has a full 2×2 MIMO (multiple-input multiple-output) processing device 210 (e.g., eNodeB). The eNodeB 210 can be enabled for dual-antenna (in general, multiple antenna) UEs and eNodeBs. MIMO is limited, in addition to the number of antennas the UEs and eNodeBs support, by the number of satellites in view from a UE and the number of antennas at the GS 200. As shown, a separate signal conditioning device and Doppler/Delay device 206 is provided for each forward signal path. However, other suitable embodiments can be utilized. For example, the signal conditioning and Doppler/Delay can be provided in a single integrated unit, which can also include a selector/diversity combiner. For example, the signal conditioning, Doppler/Delay, and selection/diversity combining can be performed at or by the eNodeB. In addition, while two downlink signal paths are shown (each from a respective satellite), more than two downlink signals can be accommodated, each one having a respective signal conditioning device and Doppler/Delay device. In other embodiments, the conditioning device can be optional and need not be provided.

In one embodiment, one or more of the components, such as the eNodeB 210, Selector/Combiner 208, compensators 206a, 206b, and/or the conditioning devices 204a, 204b, can be performed by or include a processing device, without any manual interaction. All of the components can be performed by a single processing device, or by separate respective processing devices. In addition, two or more of the components can share a processing device, e.g., the first and second conditioning devices 204a, 204b can be implemented by a first processing device, and the first and second compensators 206a, 206b can be implemented by a second processing device. Or, the first conditioning device 204a and first compensator 206a can be implemented by a first processing device, and the second conditioning device 204b and second compensator 206b can be implemented by a second processing device. The processing device can be a processor, computer, server, microprocessor, controller, smartphone or the like.

The foregoing description and drawings should be considered as illustrative only of the principles of the disclosure, which may be configured in a variety of ways and is not intended to be limited by the embodiment herein described. Numerous applications of the disclosure will readily occur to those skilled in the art. Therefore, it is not desired to limit the disclosure to the specific examples disclosed or the exact construction and operation shown and described. Rather, all suitable modifications and equivalents may be resorted to, falling within the scope of the disclosure.

The invention claimed is:

1. A ground station for processing downlink signals received from respective satellites, said ground station comprising:
   a plurality of signal conditioning devices each receiving a respective one of the downlink signals and providing a conditioned downlink signal;
   a plurality of Doppler and/or Delay compensator devices each receiving a respective conditioned downlink signal from a respective one of the plurality of signal conditioning devices, conducting Doppler and/or Delay compensation on the received conditioned downlink signal, and providing a compensated downlink signal output; and
   a selector or diversity combiner receiving the compensated downlink signal from each of said plurality of Doppler and/or Delay compensators, said selector or diversity combiner selecting one of the received compensated downlink signals based on received signal strength of each received compensated downlink signal to provide a selected downlink signal, or diversity combining all of the received compensated downlink signals to provide a diversity combined signal, and providing the selected downlink signal or the diversity combined signal to an eNodeB.

2. The ground station of claim 1, wherein the downlink signals are high frequency signals.

3. The ground station of claim 1, wherein the downlink signals are in the Q- or V-band.

4. The ground station of claim 1, wherein the signals between the ground station and the satellite are sufficiently high frequency so that they are unaffected by ionospheric scintillation.

5. The ground station of claim 1, wherein the downlink signal is relayed from a satellite.

6. The ground station of claim 5, wherein the satellite receives an uplink signal from a terminal device in LTE.

7. The ground station of claim 1, wherein the eNodeB includes:
   a multiple-input-multiple-output (MIMO) processing device configured to have multiple inputs and multiple outputs.

8. The ground station of claim 1, wherein said plurality of Doppler and/or Delay compensator devices are configured to:
   each provide the respective compensated downlink signal output with a nominal zero frequency offset.

* * * * *